United States Patent

[11] 3,594,539

| | | |
|---|---|---|
| [72] | Inventor | Thomas J. Geiermann<br>Bay City, Mich. |
| [21] | Appl. No. | 852,700 |
| [22] | Filed | Aug. 25, 1969 |
| [45] | Patented | July 20, 1971 |
| [73] | Assignee | Newcor, Inc.<br>Bay City, Mich. |

[54] TEMPLATE FOLLOWER
11 Claims, 9 Drawing Figs.

[52] U.S. Cl. .................................................. 219/108,
219/125 PL, 219/110
[51] Int. Cl. ............................................... B23k 11/24
[50] Field of Search .......................................... 219/124,
125 PL; 318/20.150, 20.160, 20.16; 77/32.2

[56] References Cited
UNITED STATES PATENTS

| 2,918,835 | 12/1959 | Watson et al. | 83/413 X |
| 2,939,287 | 6/1960 | Capron et al. | 318/20.160 UX |
| 3,232,142 | 2/1966 | Oekl et al. | 77/32.2 |

Primary Examiner—J. V. Truhe
Assistant Examiner—J. G. Smith
Attorney—Woodhams, Blanchard and Flynn ABSTRACT: A multiple station workpiece positioning device for positioning a workpiece at different stations relative to welding apparatus for permitting the performance of a plurality of welding operations thereon. The workpiece is mounted on a worktable and is guided for movement in a predetermined pattern by guide means. The guide means comprises a template having guide groove means therein receiving and guiding a follower member secured to the worktable. The guide groove means has a plurality of obstruction means therein to prevent a continued movement of the follower member and to accurately position the worktable at a plurality of stations relative to the welding apparatus. The obstruction means are bypassable by a movement of the worktable so that the follower member moves away from and around the obstruction means to permit a continued movement of the follower member and the worktable in the pattern defined by the guide groove means to the next obstruction means. At each location of the obstruction means, the worktable is accurately positioned relative to the welding apparatus so that appropriate energization of the welding apparatus will accurately place a weld onto a workpiece.

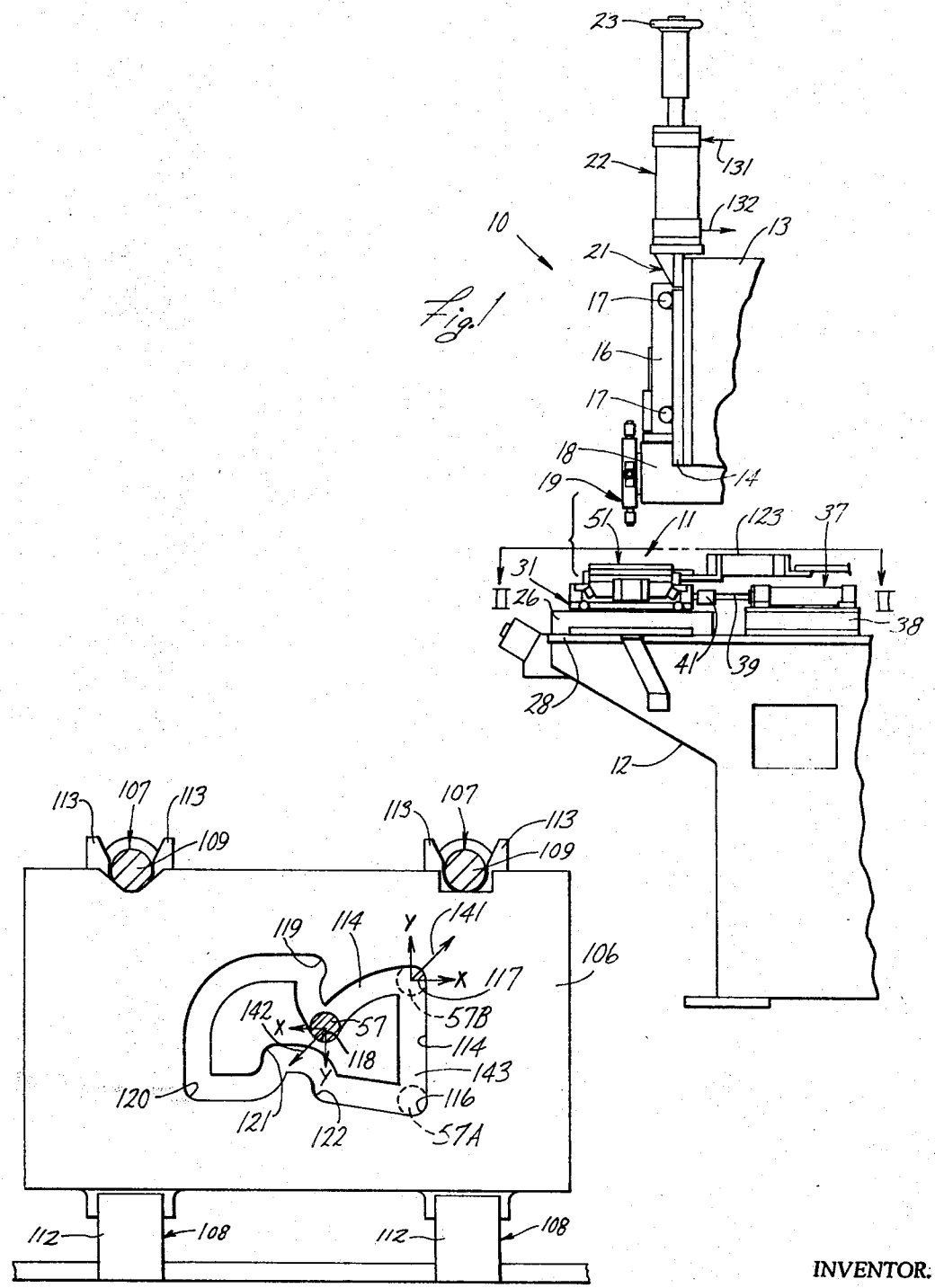

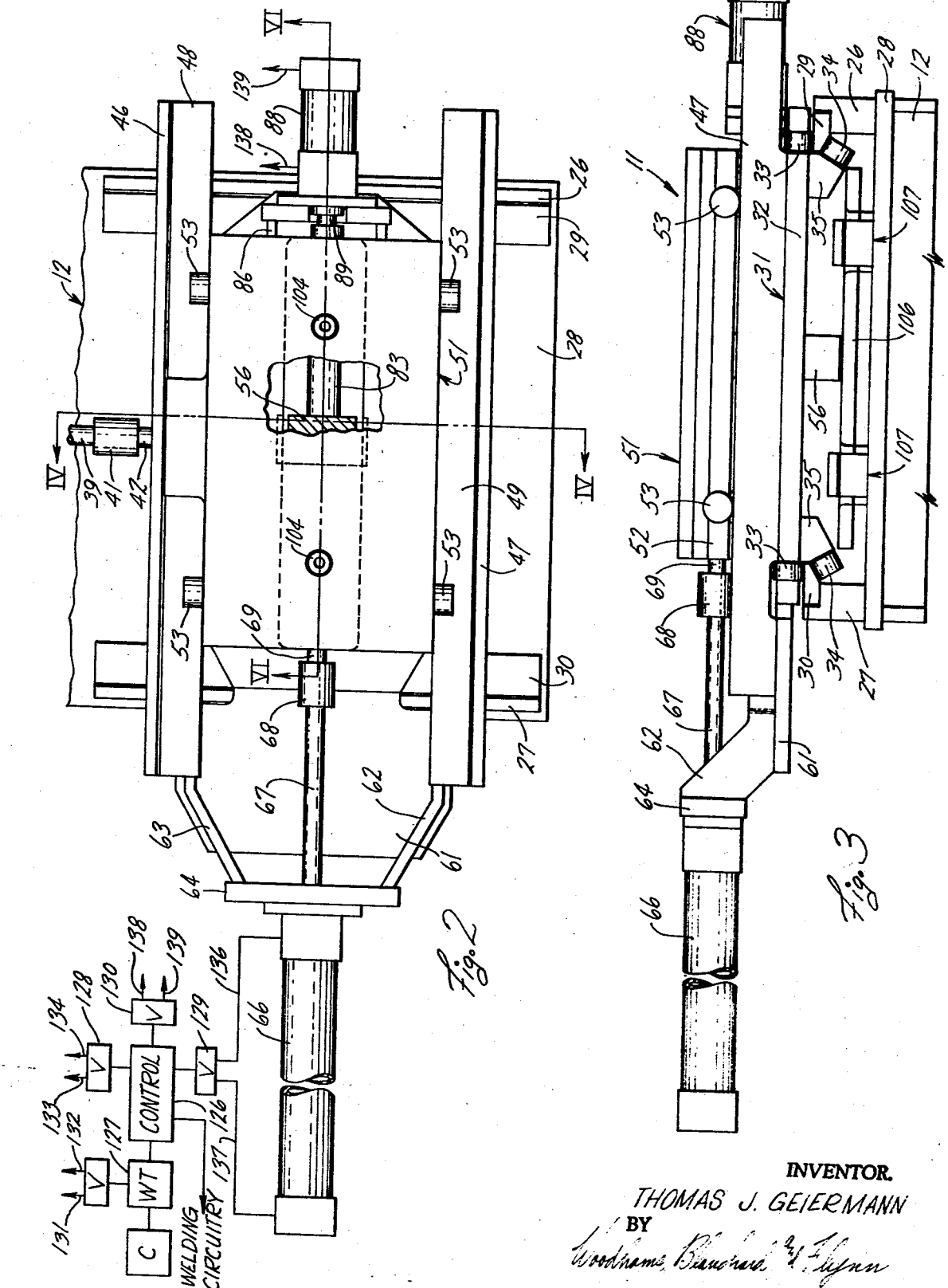

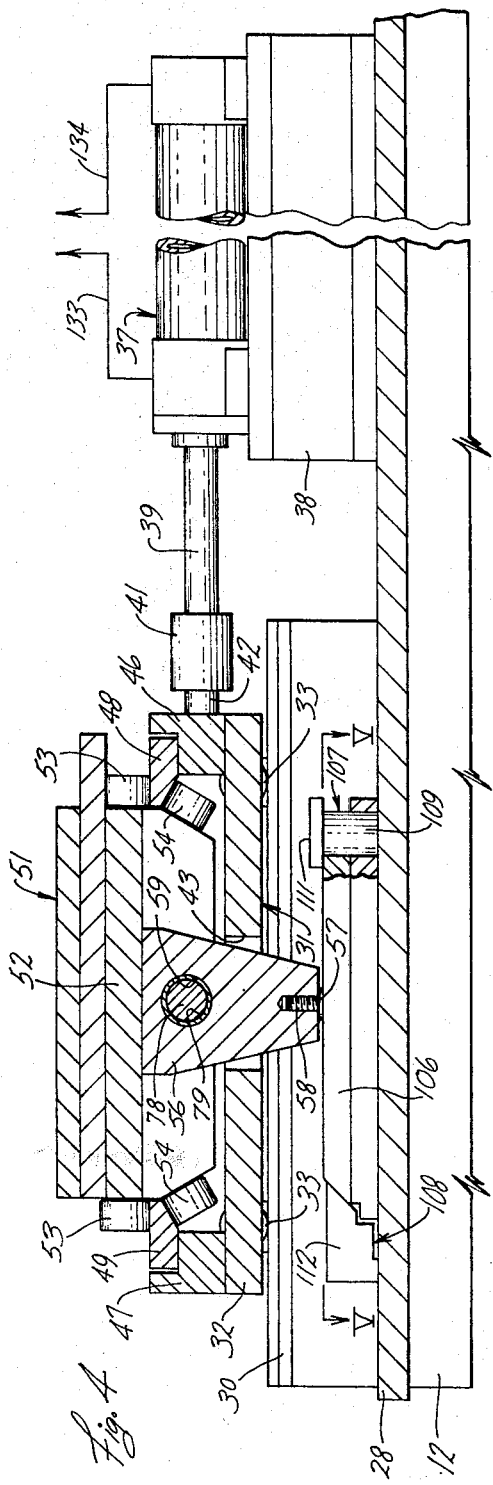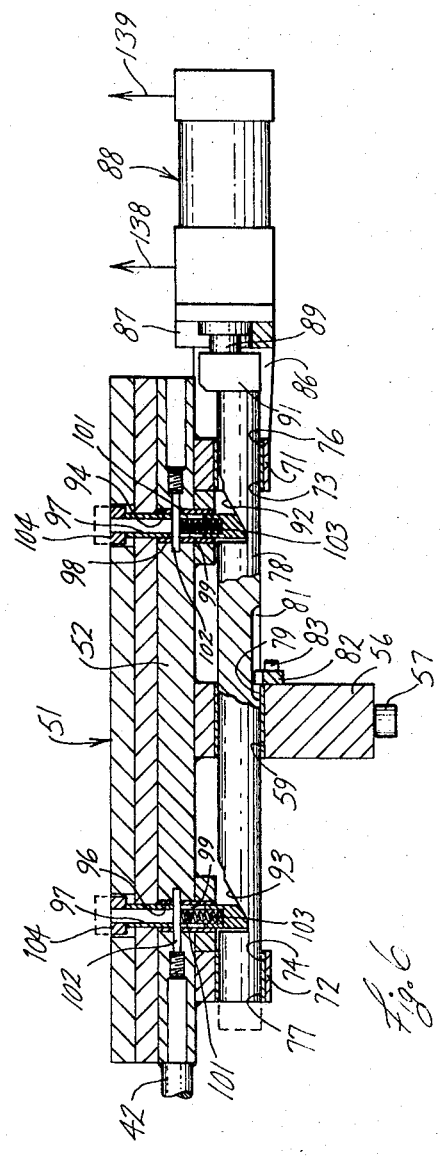

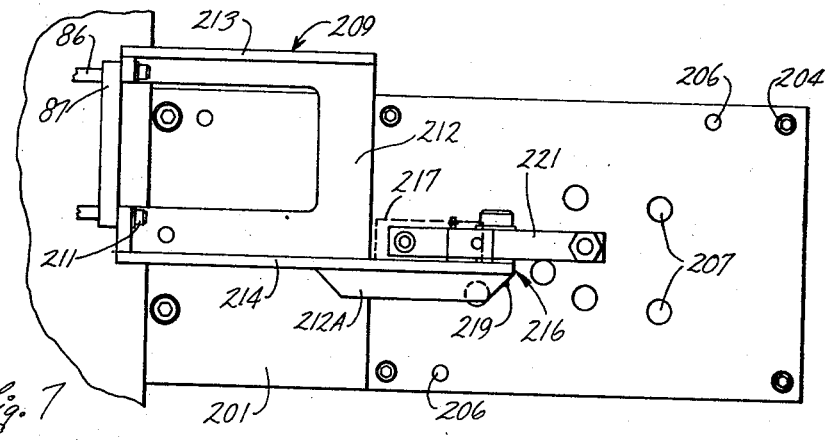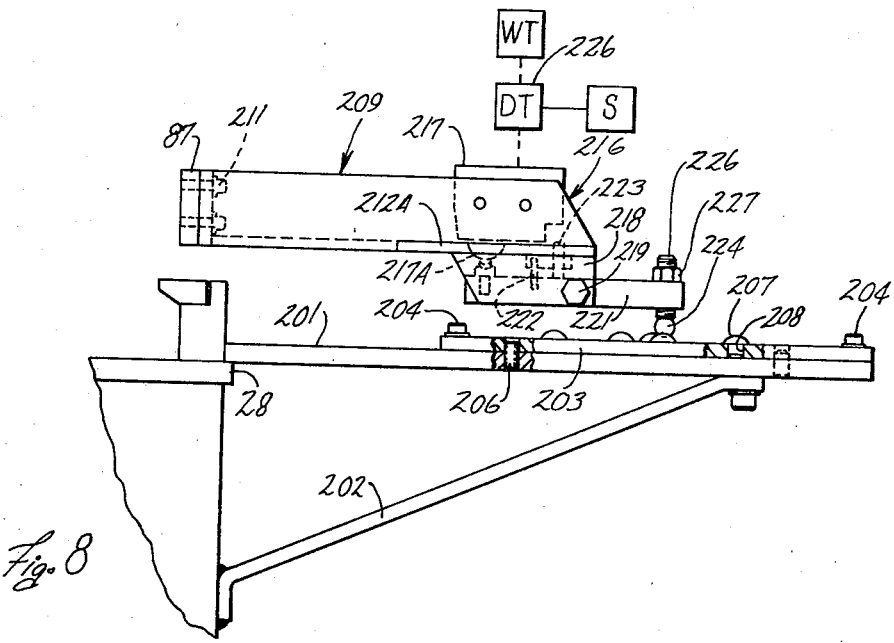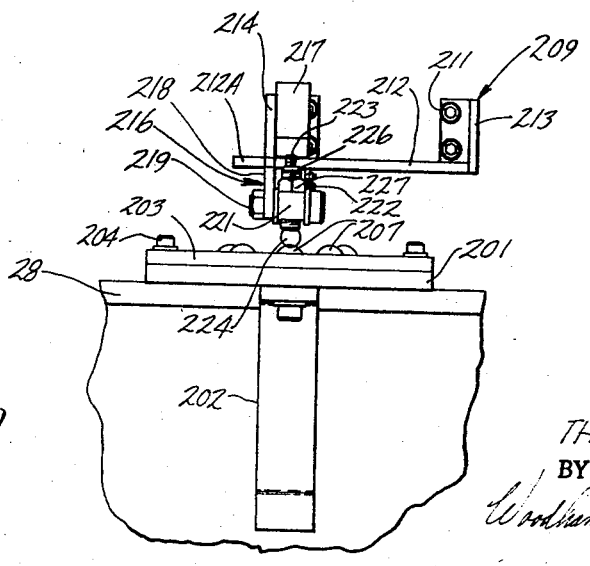

TEMPLATE FOLLOWER

FIELD OF THE INVENTION

This invention relates to a template follower mechanism and, more particularly, relates to a multiple station workpiece positioning device for positioning a workpiece at different stations relative to welding apparatus to permit the performance of a plurality of welding operations on a workpiece mounted on a worktable.

BACKGROUND OF THE INVENTION

Template follower mechanisms for use in positioning workpieces mounted on a worktable at different stations relative to workpiece processing, as machining, equipment have been known for many years. In its simplest form, worktables have been provided with a follower mechanism which is received into and guided by a template so that an operator may manually move the table and the follower mechanism in a predetermined pattern defined by the template. This simple device permitted an operator to accurately position a workpiece relative to the workpiece-machining equipment in a rapid and efficient manner, thereby improving the efficiency of production and, in the long run, reducing the expense in manufacturing various articles.

In an effort to improve the template follower apparatus, various attempts have been made to fully automate the movement of the worktable relative to the workpiece-machining equipment so that the workpiece upon reaching a predetermined position will initiate the energization of the worktool to bring it into engagement with the workpiece in order that a machining operation can be performed thereon. However, this equipment has been highly complex and expensive to manufacture and has not been entirely satisfactory from a maintenance point of view. That is, the circuitry for stopping the movement of the worktable relative to the machining equipment was generally of an electronic nature which has in many cases not been entirely accurate in locating the tool and workpiece in correct relative positions. Particularly, the correlation between the electronic equipment and the positioning of the workpiece relative to the workpiece machining equipment is expensive and oftentimes requires the provision of delicate switching devices to detect the presence of the worktable at a predetermined position so that the appropriate circuitry will be activated to halt the movement of the worktable precisely at the desired location. Oftentimes the worktable would coast past the desired position and, as a result, the work done on the workpiece by the workpiece-machining equipment would be performed at the wrong location.

Accordingly, and in an effort to further improve the multiple station workpiece-positioning device for positioning a workpiece at multiple stations relative to a worktool, it is a primary object of this invention to eliminate the complicated electronic circuitry for precisely stopping the worktable but yet still provide a mechanism which permits an accurate positioning of the workpiece and worktable relative to the worktool.

It is a further object of this invention to provide a multiple station workpiece-positioning device for positioning a workpiece relative to a worktool to permit the performance of a plurality of worktool operations thereon without requiring the removal of the workpiece from the machine in order to relocate it so that another worktool operation can be performed thereon.

It is a further object of this invention to provide a multiple station workpiece-positioning device, as aforesaid, which eliminates the complicated electrical circuitry of known devices and, instead, utilizes inexpensive components to achieve an accurate positioning of the workpiece relative to the worktool equipment.

It is a further object of this invention to provide a multiple station workpiece-positioning device which is inexpensive to manufacture and simple to maintain in satisfactory operating condition.

It is a further object of this invention to provide a workpiece-positioning device which does not require a complicated set up by aligning switches at the various positions where a worktool operation is to be performed with the worktool and compensate for a coasting of the workpiece after the switch has been actuated but, instead, only requires the utilization of a one-piece template.

It is a further object of this invention to provide a workpiece positioning device which may be set up by inexperienced personnel through the simplest verbal instructions which, after the verbal instructions have been given, the inexperienced operator will no longer need to consult a more experienced operator in order to make sure that the setup procedure has been correctly followed.

Other objects and purposes of this invention will be apparent to persons acquainted with workpiece-positioning devices of this general type upon reading the following specification and inspecting the accompanying drawings, in which:

FIG. 1 is a side view of the workpiece positioning device used in a resistance welding apparatus for accurately positioning a worktable relative to the welding electrode;

FIG. 2 is a sectional view taken along the line II–II of FIG. 1;

FIG. 3 is a front-elevational view of the workpiece positioning device illustrated in FIG. 2;

FIG. 4 is a sectional view taken along the line IV–IV of FIG. 2;

FIG. 5 is a sectional view taken along the line V–V of FIG. 4;

FIG. 6 is a sectional view taken along the line VI–VI of FIG. 2;

FIG. 7 is a top view of control means attachable to the apparatus of FIGS. 1—6 for effecting improved control thereof;

FIG. 8 is a side view of the apparatus shown in FIG. 7; and

FIG. 9 is an end view of the apparatus shown in FIGS. 7 and 8.

Certain terminology will be used in the following description for convenience in reference only and will not be limiting. The words "up," "down," "right" and 3 left" will designate directions in the drawings to which reference is made. The words "front" and "rear" will refer to the front and rear of the workpiece positioning device, the front of the workpiece-positioning device being the left side of the apparatus illustrated in FIG. 1. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing a workpiece-positioning device mounted on a base with first and second table members supported on rails for longitudinal movement transversely of each other, one of the worktables having a follower member secured thereto and movable therewith. First and second reciprocable power means are secured to each of the worktables for driving them along the rails transversely of each other. A template is fixedly mounted on the base beneath the two tables and has a guide groove, here endless, therein receiving and guiding the follower member. The guide groove has a plurality of obstructions therein to limit movement of the follower member and to thereby accurately position one of the worktables relative to the base. The obstructions are bypassable by a reversed energization of one or more of the reciprocable power means to move the follower member away from and past the obstructions to permit a continued movement of the follower member and one of the tables in a pattern determined by the endless groove.

DETAILED DESCRIPTION

Referring first to FIG. 1, a welding apparatus 10 is shown to provide an environment for the workpiece-positioning device 11. It is recognized, of course, that the workpiece-positioning device 11 could be utilized in other environments, such as material removing devices and workpiece-shaping devices. However, for purposes of discussion, the workpiece-positioning device 11 will be discussed in the environment of a welding apparatus 10 but it is to be understood that such discussion is illustrative only and not limiting.

The welding apparatus 10 comprises a base 12 and an overhanging frame member 13 secured to the base 12 at a mounting point located rearwardly of the workpiece-positioning device 11, which mounting point is conventional and not shown here. A guide member 14 is secured to the front side of the overhanging member 13. A vertically movable carriage 16 is mounted on the guide member 14 for vertical movement relative thereto. Roller elements 17 are here rotatably mounted to the carriage 16 and engage the guide member 14 for the usual purposes. A mounting member 18 is secured to the lower end of the carriage 16 and has a welding electrode mechanism 19 secured to the front side thereof. Electrical power is supplied to the welding electrode mechanism 19 by any convenient means not shown. A mounting Amounting bracket 21 is secured to the front side of the overhanging frame member 13 and supports a power cylinder 22 thereon. The rod (not shown) of the cylinder 22 is connected to the vertically movable carriage 16 for driving same for vertical movement. If desired, a handwheel 23 may be provided in a conventional manner for adjusting the stroke of the rod of the power cylinder 22 to regulate the vertical movement of the electrode mechanism 19 relative to the workpiece-positioning device 11.

The workpiece-positioning device 11 (FIGS. 2 and 3) comprises a pair of elongated and parallel flanges 26 and 27 which are fixedly mounted on a mounting plate 28 fixed to the base 12. In this particular embodiment, the flanges 26 and 27 are horizontally spaced and extend between the front and rear edges of the mounting plate 28. A pair of rails 29 and 30 are fixedly mounted on the flanges 26 and 27, respectively, and extend inwardly toward the center of the mounting plate 28. A horizontally movable carriage 31 is mounted for longitudinal movement along the rails 29 and 30. More particularly, the carriage 31 comprises a plurality of roller elements 33 and 34 engaging the upper and lower surfaces, respectively, of the rails 29 and 30 so that the carriage 31 is guided accurately along the rails 39 and 30. In this particular embodiment, the roller elements 34 are mounted on feet 35 which project from the underside of the base 32 of the carriage 31 and rotatably support the roller elements 34 so that the axes thereof are inclined to the horizontal and permit engagement with an inclined surface 36 on the underside of the rails 29 and 30 whereby combination of roller elements 33 and 34 will prevent the carriage 31 from becoming skewed relative to the rails 29 and 30. Thus, the carriage 31 will move longitudinally of the rails in a precisely defined path.

A power cylinder 37 (FIG. 4) is fixedly mounted on a pedestal 38 which is secured to the base 12. The rod 39 of the power cylinder 37 is connected through a coupling device 41 to a stub member 42 fixedly secured to the carriage 31.

In this particular embodiment, an elongated slot 43 is provided in the base 32 of the carriage 31. The purpose of this slot will become apparent hereinbelow.

A pair of elongated and parallel flanges 46 and 47 are fixedly secured to the upper surface of the base 32 of the carriage 31 parallel with the slot 43 and are movable therewith. A pair of rails 48 and 49 are secured to the flanges 46 and 47, respectively, and extend inwardly therefrom.

In this particular embodiment, a worktable 51 is mounted for longitudinal movement along the rails 48 and 49. More particularly, the worktable 51 comprises a frame 52, which frame has a pair of roller elements 53 and 54 rotatably secured thereto on both the front and rear sides thereof in a manner similar to the roller 33 and 34 secured to the carriage 31. In this particular embodiment, the roller elements 53 engage the upper surface of the rails 48 and 49 whereas the rollers 54 engage an inclined surface on the underside of the rails 48 and 49 to prevent the worktable 51 from becoming skewed relative to the rails 48 and 49. Thus, the worktable 51 will move longitudinally of the rails in a precisely defined path.

A stylus 56 is secured to the lower surface of the frame 52 and extends downwardly therefrom. A rotatably supported follower element 57 is secured to the stylus 56 by any convenient means such as the threaded connection 58. In this particular embodiment, an opening 59 (FIG. 6) is provided in the central portion of the stylus, the purpose of which will become apparent hereinbelow. The stylus 56 projects downwardly from the frame 52 through the opening 43 in the base 32 of the carriage 31. Since the slot 43 is elongated in a direction from left to right, as viewed in FIG. 2, the worktable 51 is permitted to move longitudinally of the rails 48 and 49 which are parallel to the slot 43 and the stylus 56 will project through the slot 43 and move therewith in an unobstructed manner.

The base 32 of the carriage 31 has an extension 61 (FIGS. 2 and 3) thereon extending leftwardly of the workpiece-positioning device 11. A pair of bracket arms 62 and 63 are fixedly secured to the extension 61 and a mounting plate 64 interconnects the left ends thereof. A power cylinder 66 is fixedly secured to the mounting plate 64 and extends leftwardly therefrom. The rod 67 of the power cylinder 66 is connected through a coupling device 68 to a stub member 69, which stub member 69 is fixedly secured to the frame 52 of the worktable 51. Thus, energization of the power cylinder 66 will effect longitudinal movement of the worktable 51 along the rails 48 and 49, which movement will be perpendicular to that along the rails 29 and 30 supporting the carriage 31.

A pair of flanges 71 and 72 (FIG. 6) are secured to the underside of the frame 52 of the worktable 51 and extend downwardly therefrom. Each of the flanges 71 and 72 is provided with an opening 73 and 74, respectively, therethrough, which openings 73 and 74 are axially aligned with the opening 59 in the stylus 56. Bushing elements 76 and 77 are provided in the openings 73 and 74, respectively, to permit a relative sliding movement of an elongated rod 78 extending therethrough. Similarly, a bushing element 79 is provided in the opening 59 in the stylus 56 to permit a relative sliding movement of the elongated rod 78 therewithin. In this particular embodiment, the elongated rod 78 has a longitudinally extending slot 81 therein, which slot 81 receives a keyed member 82 fixedly secured to the stylus 56 by a screw 83 to prevent the rod 78 from rotating.

A pair of bracket members 84 and 86 (FIGS. 2 and 6) are secured to the underside of the frame 52 along the right edge thereof. A mounting plate 87 is fixedly secured to the right ends of the bracket members 84 and 86. A power cylinder 88 is fixedly secured to the right side of the mounting plate and extends rightwardly therefrom. The rod 89 of the power cylinder 88 is connected through a coupling member 91 to the right end (FIG. 6) of the elongated rod 78 which extends through the openings 73 and 74 in the flanges 71 and 72, respectively, and the opening 59 through the stylus 56.

A pair of tapered notches 92 and 93 are provided in the elongated rod 83 along the upper surface thereof. The tapered portion of each slot is inclined upwardly in the direction of the power cylinder 74. A pair of openings 94 and 96 are provided in the frame 52 and are, in this particular embodiment, vertically aligned with the tapered slots 92 and 93, respectively. The openings 94 and 96 extend upwardly through the remainder portion of the worktable 51 and open outwardly on the top surface thereof. A vertically slideable and hollow shoe 97 is slideably mounted in each of the openings 94 and 96 with a bushing member 98 being mounted between the shoe 97 and the wall of the openings 94 and 96 to facilitate the vertical sliding movement of the shoe 97. The lower end of the shoe 97 is closed and tapered and engages the surface of the tapered slots 92 and 93. The shoe 97 is provided with a pair of diametrically opposed elongated slots 99 and 101 which receive a pin 102 therethrough, which pin 102 is fixedly secured to the frame 52. A resilient spring member 103 is secured between the pin 102 and the closed bottom of the hollow opening in the shoe 97 to resiliently urge the shoe 97 into engagement with the surface of the tapered slots 92 and 93. A foot 104 is fixedly secured to the upper end of the shoe 97 and is normally maintained in a flush position relative to the top of the worktable 51. Thus, upon an energization of the power cylinder 88, an extension of the rod 89 and a movement of the elongated rod 78 leftwardly to the dotted line position illustrated in FIG. 6 will effect a vertical movement of the shoes 97 against the resilient urging of the springs 103 to move the feet 104 vertically upwardly to the dotted line position to move a workpiece mounted on the worktable 51 vertically therefrom to facilitate a removal thereof at, for example, the completion of a worktool operation.

In this particular embodiment, a template 106 (FIGS. 3, 4 and 5) is fixedly secured to the mounting plate 28 the elongated flanges 26 and 27. The template 106 is maintained in a fixed position relative to the mounting plate 28 by clamping devices 107 and 108. In this particular embodiment, the clamping device 107 consists of a post 109 which is fixedly secured to the mounting plate 28 by any convenient means and has an enlarged head 111 at the upper end thereof. The clamping device 108 consists of a block 112 which is urged into engagement with the edge of the template 106 to urge the template 106 against the post 109 and then secured to the mounting plate 28. The template 106 is provided with a pair of bifurcated guide members 113 (FIG. 5) which engage the sides of each of the posts 109 to hold the template 106 against sideward movement of the left and to the right of the illustration in FIG. 5.

A guide groove 114 (FIG. 5), here endless, is provided in the template 106 and receives the rotatable follower device 57 secured to the stylus 56. The endless groove 114 has a plurality of pockets, here pockets 116—122, into which the follower device 57 is moved. Each pocket 116—122 is accurately machined to define a precise location on the mounting plate 28 so that the worktable 51 is moved accurately to locate same relative to the welding electrode mechanism 19 illustrated in FIG. 1.

Since, in this particular embodiment, the workpiece positioning device 11 is utilized in a resistance welding environment, a conductor mechanism 123 (FIG. 1) is secured to the worktable 51 in a known manner to complete the electrical circuitry between the welding electrode mechanism 19 and the worktable 51.

A control device 126 is schematically illustrated in FIG. 2 and is capable of controlling in a predetermined pattern the energization of valves 128, 129 and 130 for controlling the power cylinders 37, 66 and 88, respectively, and for initiating a conventional welding timer WT. In this particular embodiment, the output of the welding timer WT goes back to a conventional contactor C and to solenoid valve V which latter in turn directs pressure fluid through a pair of conduits 131 and 132 to the power cylinder 22 illustrated in FIG. 1. The output of the valve 128 is directed through a pair of conduits 133 and 134 to the power cylinder 37 illustrated in FIG. 4. The output of the valve 129 is directed through a pair of conduits 136 and 137 to the power cylinder 66 illustrated in FIGS. 2 and 3. The output of the valve 130 is directed through a pair of conduits 138 and 139 to the power cylinder 88 illustrated in FIG. 2, 3 and 6.

The control 126 may be of any convenient type according to the complexity of programming required. In the particular apparatus shown in the drawings, said control 126 is merely a stepping switch of simple and conventional type. For more complicated patterns, a more complex control will be required of which several are available commercially, such as that illustrated in a pamphlet entitled "Tenor Stepping Drum Programmers" published by the Tenor Company in Milwaukee, Wis. in 1966. The control will be programmed in a known manner to effect a properly programmed energization of each of the power cylinders 37, 66 and 88, as well as proper initiation of the welding sequence timer WT. Said control 126 may be arranged in any conventional manner as desired to respond to any available triggering means, such as a shift in position of the power cylinders or, as in the illustrated embodiment, to the elapsing of a predetermined time period between successive steps thereof.

OPERATION

Although the operation of the device embodying the invention will be apparent to those skilled in the art, a summary of the operation will be given below for convenience in understanding the invention.

It will be first assumed that at the start of the first cycle of operation, the follower device 57 is in the dotted line position 57A illustrated in FIG. 5. Thus, the rod 39 of the power cylinder 37 will be fully extended so that the carriage 31 is in the forwardmost position relative to the welding apparatus 10. Similarly, the rod 67 of the power cylinder 66 will be fully extended so that the worktable 51 will be in the rightwardmost position of its travel illustrated in FIGS. 2 and 3. Correspondingly, the power cylinders 22 and 88 are both in the retracted position at the start of the operative cycle.

Considering position 57A to be the first weld station, the welding timer is initiated by suitable start means and the welding cycle proceeds. At the termination thereof, any desired triggering means, such as the mechanical retraction of the welding electrodes or the reversal in pressure in the lines 131, 132, will energize the control device 126, such as by causing same to advance one step if same is a stepping switch, whereby to actuate the valves 128 and 129 to initiate, through lines 133, 134, 136 and 137, an energization of the power cylinders 37 and 66 to effect a movement of the follower mechanism to the position 57B illustrated in FIG. 5. This is accomplished through the energization of the power cylinder 37 to retract the rod 39 to move the carriage 31 rearwardly along the rails 29 and 30. Since the worktable 51 is mounted on the carriage 31, the worktable will move rearwardly with the carriage 31 to move the follower device along therewith through the open side 143 of the pocket 116. The power cylinder 66 is simultaneously energized to effect an extension of the rod 67 to maintain the follower mechanism 57 in engagement with the outer peripheral wall of the guide groove 114. Once the follower mechanism 57 has reached the position 57B in FIG. 5, it will be positioned in pocket 17 so that further retraction of the rod 39 of the power cylinder 37 and further extension of the rod 67 of the power cylinder 66 will be prevented because the resultant vector 141 of the two X-Y forces is directed into the outer peripheral wall of the guide groove 114. This thereby results in an accurate positioning of the worktable 51 relative to the electrode mechanism 19 of the welding apparatus 10 and the follower mechanism is received into the pocket 117. At this point the control 126 again operates, such as by another step of as stepping switch where such is sued, either in response to the elapsing of a predetermined amount of time from the first energizing as in the illustrated embodiment or in response to some other selected signal such as the mechanical shifting of the power cylinders, to energize the welding timer WT to start a welding sequence. Following the completion of the welding sequence, the control 126 is again stepped again in response in the illustrated embodiment to the elapsing of a given amount of time or, if desired, in response to the termination of the weld cycle, and the next sequence of power cylinders proceeds. In this embodiment the control 126 energizes valve 129 to effect an actuation of power cylinder 66 to cause a retraction of the rod 67 to drive the worktable 51 and follower mechanism 57 leftwardly (FIGS. 2 and 5) and to move the follower mechanism 57 through the open side 144 of the pocket 117. Next, the power cylinder 37 is actuated to extend the rod 39 and move the carriage 31 frontwardly (FIGS. 2 and 5) so that the follower mechanism 57 will move from pocket 117 toward pocket 118. Once the follower mechanism 57 has reached the central pocket 118, a further extension of the rod 39 of the power cylinder 37 and a further retraction of the rod 67 of the power cylinder 66 will be prevented due to the resultant vector component 142 of the two X-Y forces being directed into the internal wall of the guide groove 114 so that the follower mechanism is fixedly maintained in the pocket 118 and thereby accurately position the worktable 51 relative to the electrode mechanism 19. A continued sequential operation of the power cylinders 37 and 66 and welding timer WT by the control 126 will effect a movement of the follower mechanism 57 in the guide groove 114 through the remaining pockets 119—122 and initiate at each position a desired welding operation and will do so without requiring a removal of the workpiece from the worktable and realigning same with the electrode mechanism 19.

A the completion of the movement of the follower mechanism 57 between the pockets 116—122 and the follower mechanism 57 has again moved back to the starting position 57A in pocket 116, the control 126 will sequentially initiate an energization of the valve 130 to effect an actuation through lines 138 and 139 of the power cylinder 88. This effects an extension of the rod 89 thereof to cause the elongated rod 78 to move leftwardly (FIG. 6) to cause the shoes 97 to be urged upwardly by the tapered upper surfaces of the slots 92 and 93. The resilient spring members maintain an engagement of the lower surface of the shoes 97 with the tapered surfaces of the slots 92 and 93. A raising of the shoes 97 will move the feet 104 to the dotted line positions illustrated in FIG. 6 to effectively move a workpiece mounted on the worktable 51 off the worktable 51 so that an operator of the welding apparatus 10 can easily grip the workpiece to remove it from the worktable 51. Simultaneously with the energization of the power cylinder 88, the control device 126 may be halted so that the operator can remove the workpiece from the worktable without fearing an inadvertent restarting of a cycle of operation.

At the completion of the process of removing a finished workpiece and placing an unfinished workpiece on the worktable, the operator can then initiate an energization of he control 126 to repeat the aforedescribed process.

The foregoing use of the template 106 in combination with the power cylinders 37 and 66 effectively eliminates the necessity for complicated electrical circuitry for accurately stopping the carriage 31 and worktable 51 to accurately position a workpiece relative to the electrode mechanism 19. Instead, a conventional control device 126, such as a simple stepping switch, can adequately control the sequential operation of the power cylinders 37 and 66 to effect the movement of the follower mechanism 57 in the guide groove 114 between the plurality of accurately positioned pockets 116—122 and to further control the initiation of the welding timer as each welding location is attained.

MODIFICATION

While the foregoing-described embodiment is effective, it lies within the scope of the invention to provide further control means by which the operations may be further refined, more accurately controlled and the time required for each cycle diminished.

In the above-described embodiment, it was stated that a given amount of time is provided between the operation of the stepping switch by which the table 51 is shifted and the subsequent initiation of a weld cycle. This means that unless the stepping switch itself is capable of accurate time selection between steps, it is necessary to provide between each step an increment of the time equal to that required for the largest stroke taken by the power cylinders between successive welding positions. Thus, for example, if the largest of such strokes of 4 inches, enough time must be provided between actuations of the stepping switch for a cylinder to execute a 4-inch stroke even through other strokes may be less. While the amount of time thus wasted in a single operation is very small, since this is high-speed equipment which will be used for a large number of units over a long period of repeated operations, the accumulated wasted time may become rather substantial. Thus, in some instances, where the economics justify it, it is desirable to control the operation of the power cylinders even more precisely. Such is the purpose of the hereinafter to be described modification.

In this modification, as illustrated in FIG. 7 and 8, there is provided a platform 201 projecting laterally from the mounting plate 28 and preferably reinforced by a brace 202. The platform 201 supports a cylinder template 203 in any suitable manner, such as by the screws 204. Alignment dowels 206 may be used if desired for assuring precise alignment of said cylinder template with respect to the platform 201. A plurality of cam heads 207 are provided on the cylinder template 203 in the same pattern as required for the welding stations 116—122 provided by the template 106 as described above. These cam heads 207 are provided in any convenient manner, such as by round-headed studs driven into accurately positioned openings 208 in the cylinder template 203.

A switch arm 209 is affixed rigidly to the table 51 and projects from same over the cylinder template 203. Same may be fastened to said table 51 in any convenient manner, such as by the screw 211. The switch arm 209 in this embodiment consists of a bottom plate 212 having a pair of upstanding stiffeners 213 and 214. Stiffener 214 extends rightwardly of the plate 212 and cooperates with a laterally extending portion 212A of the plate 212 to provide a rigid switch support indicated generally at 216. A switch 217 of any convenient type, such as a microswitch, is rigidly affixed to the rightward portion of the stiffener 214 with its actuating element 217A extending downwardly below the horizontal extension 212A. Projecting downwardly from the portion 212A is a further flange 218 which supports pivotally at 219 an actuating arm 221. Said arm 221 is desirably provided a spring 222 which tends to urge the leftward end of the arm 221 on upwardly and if desired, there may also be provided a setscrew 223 which limits the upward movement of the leftward end of the arm 221 and thereby protects the switch actuator 217A against damage. The rightward end of the actuator arm 221 is provided with a cam follower 224 which is preferably mounted through a screw 226 and nut 227 to effect accurate vertical adjustment of the actuator 224.

It will be recognized that as the table 51 moves in the pattern determined by the template 106, as above-described, the actuator 224 will move in a corresponding pattern and will be moved upwardly as same strikes successively the several cam heads 207. The switch 217 will be shifted as the actuator 224 approaches each cam head in said pattern.

In operation with this arrangement, the switch 217 is connected into the circuit for energizing the welding timer WT, where initiation of the welding sequence is desired immediately upon the attainment by the table 51 of a predetermined welding station. However, for a still more precise operation, there may be provided a delay timer 226 between the power source S and the welding timer WT. Assuming said delay timer to be in position, the operation of the presently described modification is as follows.

With the table 51 in the first welding station, the first welding sequence is initiated, as above-described, and proceeds through to completion, whereupon the power cylinders are actuated and the table 51 moved according to the template 106 to the second welding station. As the table 51 approaches the second welding station, the actuator 224 strikes a corresponding one of the cam studs 207 to actuate the switch 217. This starts the timer 226 which is set for a short, though definite, period of time, such as a few cycles of the 60-cycle supply. Upon the expiration of this time, the power cylinders will have seated the table 51 precisely according to the template 106 and and the timer 226 will then start the welding timer WT. By providing the slight delay afforded by the delay timer 226, assurance is obtained that the table 51 will be in precisely the desired position before the welding sequence starts but by suitably controlling the amount of time utilized by the timer 226 unnecessary delay is avoided.

The welding sequence then proceeds and upon its termination the next step occurs and the cycle as above described repeats.

Although particular preferred embodiments of the invention have been disclosed in detail for illustrative purposes, it will be recognized that other variations and modifications of the disclosed apparatus, including the rearrangement of parts, lie within the scope of the present invention.

The embodiments of the invention in which I claim an exclusive property or privilege are defined as follows:

1. A multiple station workpiece positioning device, comprising:
   first table means supported on a base for longitudinal movement and second table means mounted on said first table means for longitudinal movement transversely of the longitudinal movement of said first table means, a follower member secured to said second table means and movable therewith;
   first and second reciprocable power means secured to said first and second table means, respectively, for driving said first and second table means for longitudinal transverse movement relative to each other;
   sequence means for selectively energizing said first and second reciprocable power means for independent reciprocable motion;
   a template fixedly mounted on said base, said template having guide means therein for guiding the follower member and said first and second table means in a predetermined pattern fixed by said guide means, said guide means having a plurality of bypassable obstruction means therein, said sequence means selectively energizing said first and second reciprocable power means for movement in one direction to drive said follower member into engagement with said bypassable obstruction means to thereby limit movement of said first and second table means and said follower member relative to said guide means and to hold said follower member in engagement with said obstruction means to accurately position and maintain said first and second table means at successive ones of said multiple stations, said bypassable obstruction means being open on one side thereof, said sequence means energizing at least one of said reciprocable power means for movement in an opposite direction from said one direction to move said follower member through said open side to bypass said obstruction means to permit a continued movement of said follower member and said first and second table means in said pattern determined by said guide means toward another of said multiple stations.

2. The multiple station workpiece-positioning device defined in claim 1, wherein said reciprocable power means are fluid operated cylinders.

3. The multiple station workpiece-positioning device defined in claim 1, wherein each of said plurality of bypassable obstruction means comprises a pocket in said guide means, said follower member being receivable and maintained in said pocket by said sequence means effecting a selectively timed energization of said first and second reciprocable power means.

4. The multiple station workpiece-positioning device defined in claim 1, wherein said guide means is an endless groove.

5. The multiple station workpiece-positioning device defined in claim 1, including ejector means for moving a workpiece mounted on said second table off said second table at the completion of a predetermined number of sequential positionings of said workpiece-positioning device.

6. A multiple station workpiece-positioning device defined in claim 1, including also welding means and a further template rigidly positioned with respect to said first above-mentioned template and having stations thereon corresponding to the location of said obstruction means on said first above-mentioned template, a follower engageable with the stations of said further template and a switch energizable upon engagement by said follower of said stations, and circuitry effecting initiation of a welding sequence upon actuation of said switch.

7. The device defined in claim 6, including also delay means in said circuitry whereby said welding sequence is initiated a predetermined time following the actuation of said switch.

8. The device defined in claim 7, including welding means fixed with respect to said template and means initiating a welding cycle through said welding means a predetermined period of time following an energization of said reciprocable power means.

9. The device defined in claim 1, including welding means fixed with respect to said template and means initiating a welding cycle through said welding means a predetermined period of time following each energization of said reciprocable power means and further means responsive to completion of welding cycle for effecting the next energization of said reciprocable power means.

10. The device defined in claim 1, including welding means fixed with respect to said template and means initiating a welding cycle through said welding means a predetermined period of time following the arrival of said guide means at one of said bypassable obstruction means.

11. The device defined in claim 1, wherein said template is fixedly mounted on said base directly beneath said first and second table means.